(12) United States Patent
Chae

(10) Patent No.: US 11,659,123 B2
(45) Date of Patent: May 23, 2023

(54) INFORMATION PROCESSING DEVICE, INFORMATION PROCESSING SYSTEM, INFORMATION PROCESSING METHOD AND PROGRAM FOR EXTRACTING INFORMATION OF A CAPTURED TARGET IMAGE BASED ON A FORMAT OF THE CAPTURED IMAGE

(71) Applicant: Rakuten Group, Inc., Tokyo (JP)

(72) Inventor: Yeongnam Chae, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/056,825

(22) PCT Filed: Jun. 28, 2019

(86) PCT No.: PCT/JP2019/025873
§ 371 (c)(1),
(2) Date: Nov. 19, 2020

(87) PCT Pub. No.: WO2020/261546
PCT Pub. Date: Dec. 30, 2020

(65) Prior Publication Data
US 2021/0176375 A1    Jun. 10, 2021

(51) Int. Cl.
*H04N 1/32*        (2006.01)
*H04N 1/00*        (2006.01)
(Continued)

(52) U.S. Cl.
CPC ....... *H04N 1/32352* (2013.01); *G06K 7/1434* (2013.01); *G06K 7/1447* (2013.01); *H04N 1/00167* (2013.01); *H04N 1/344* (2013.01)

(58) Field of Classification Search
CPC .............. H04N 1/344; H04N 1/32352; H04N 1/00167; G06K 7/1434; G06K 7/1447; G06Q 50/10
(Continued)

(56) References Cited

U.S. PATENT DOCUMENTS 8,651,370 B1 * 2/2014 Mudrick ............ G06Q 30/0239
235/375
2004/0024844 A1 * 2/2004 Holmstead ............ G06F 3/1265
709/219
(Continued)

FOREIGN PATENT DOCUMENTS

JP    2000227756 A  *  8/2000  ............ G06F 21/10
JP    2007-094672 A     4/2007

OTHER PUBLICATIONS

Communication dated Mar. 30, 2021 from the European Patent Office in European Application No. 19928296.3.
(Continued)

*Primary Examiner* — Chad Dickerson
(74) *Attorney, Agent, or Firm* — Sughrue Mion, PLLC

(57) ABSTRACT

Photographed image acquisition means (201) of an information processing device (20) acquires a photographed image photographed by photographing means (25) capable of photographing a target image including predetermined information. Reference means (202) refers to storage means (200) for storing the target image photographed in the past and information extracted from the target image in the past, in association with each other. Determination means (207) determines whether or not the target image photographed in the past has been captured in the photographed image. Processing execution means (211) executes, when the target image photographed in the past has been captured in the
(Continued)

photographed image, predetermined processing based on the information associated with the target image.

16 Claims, 8 Drawing Sheets

(51) Int. Cl.
 *G06K 7/14* (2006.01)
 *H04N 1/34* (2006.01)
(58) Field of Classification Search
 USPC ....... 358/3.28, 1.11–1.18; 348/207.99, 207.1
 See application file for complete search history.

(56) References Cited

U.S. PATENT DOCUMENTS

| | | | | |
|---|---|---|---|---|
| 2004/0128512 A1* | 7/2004 | Sharma | ............. | G06Q 20/3827 |
| | | | | 713/176 |
| 2005/0286463 A1* | 12/2005 | Matsumoto | ....... | H04M 15/8242 |
| | | | | 370/328 |
| 2008/0056541 A1* | 3/2008 | Tani | ...................... | G06Q 30/02 |
| | | | | 382/115 |
| 2012/0205437 A1* | 8/2012 | Sauerwein, Jr. | ..... | G06K 7/0004 |
| | | | | 235/375 |
| 2012/0275642 A1* | 11/2012 | Aller | ................... | G06F 3/04886 |
| | | | | 382/100 |
| 2013/0256403 A1* | 10/2013 | MacKinnon | ........... | G06Q 20/20 |
| | | | | 235/375 |
| 2014/0080428 A1* | 3/2014 | Rhoads | ............... | G06F 16/9535 |
| | | | | 455/88 |
| 2014/0119614 A1* | 5/2014 | Mochizuki | .......... | G06F 16/5838 |
| | | | | 382/110 |
| 2015/0049900 A1* | 2/2015 | Kamitani | ........... | H04N 21/4722 |
| | | | | 382/100 |
| 2016/0267369 A1* | 9/2016 | Picard | .............. | G06K 19/06037 |

OTHER PUBLICATIONS

Matthew Tancik, et al., "StegaStamp: Invisible Hyperlinks in Physical Photographs", https://arxiv.org/abs/1904.05343, Mar. 26, 2020, pp. 1-13.

International Search Report for PCT/JP2019/025873 dated Sep. 17, 2019 (PCT/ISA/210).

* cited by examiner

FIG.5

| TARGET IMAGE | EMBEDDED INFORMATION |
|---|---|
| aaa.jpg | http://xxx.com/product/...... |
| bbb.jpg | http://yyy.co.jp/company/...... |
| ccc.jpg | http://zzz.com/index/...... |
| . . . | . . . |

DT

ADJUST, FOR EXAMPLE, SIZE TO CUT OUT

INFORMATION PROCESSING DEVICE, INFORMATION PROCESSING SYSTEM, INFORMATION PROCESSING METHOD AND PROGRAM FOR EXTRACTING INFORMATION OF A CAPTURED TARGET IMAGE BASED ON A FORMAT OF THE CAPTURED IMAGE

CROSS REFERENCE TO RELATED APPLICATIONS

This application is a National Stage of International Application No. PCT/JP2019/025873 filed Jun. 28, 2019.

TECHNICAL FIELD

The present invention relates to an information processing device, an information processing system, an information processing method, and a program.

BACKGROUND ART

Hitherto, a technology for analyzing a target image including predetermined information and extracting information from the target image has been investigated. For example, in Patent Literature 1, there is described a technology in which an article, a photograph, or another such target image is photographed with a camera and the photographed image is analyzed, to thereby extract digital watermark information embedded in the target image. In addition, for example, in Non-patent Literature 1, there is described a technology in which information is embedded in a photograph in advance and the photographed image is input to a machine learning model, to thereby extract the information embedded in the photograph.

CITATION LIST

Patent Literature

[PTL 1] JP 2007-94672 A

Non Patent Literature

[NPL 1] Matthew Tancik, Ben Mildenhall, Ren Ng, StegaStamp: Invisible Hyperlinks in Physical Photographs, https://arxiv.org/abs/1904.05343

SUMMARY OF INVENTION

Technical Problem

However, with the technology described in each of Patent Literature 1 and Non-patent Literature 1, every time a computer acquires a new photographed image, complicated processing is required to be executed to extract information embedded in a target image, thereby increasing a processing load on the computer.

One embodiment of the present invention has been made in view of the above-mentioned issue, and has an object to provide an information processing device, an information processing system, an information processing method, and a program therefor, which are capable of reducing the processing load.

Solution to Problem

In order to achieve the above-mentioned object, according to one embodiment of the present invention, there is provided an information processing device including: photographed image acquisition means for acquiring a photographed image photographed by photographing means capable of photographing a target image including predetermined information; reference means for referring to storage means for storing the target image photographed in the past and the information extracted from the target image in the past, in association with each other; determination means for determining whether the target image photographed in the past has been captured in the photographed image; and processing execution means for executing, when the target image photographed in the past has been captured in the photographed image, predetermined processing based on the information associated with the target image.

According to one embodiment of the present invention, there is provided an information processing system including: the information processing device of any one of description above and description below; and the server of any one of description below.

According to one embodiment of the present invention, there is provided an information processing method including the steps of: acquiring a photographed image photographed by photographing means capable of photographing a target image including predetermined information; referring to storage means for storing the target image photographed in the past and the information extracted from the target image in the past, in association with each other; determining whether the target image photographed in the past has been captured in the photographed image; and executing, when the target image photographed in the past has been captured in the photographed image, predetermined processing based on the information associated with the target image.

According to one embodiment of the present invention, there is provided a program for causing a computer to function as: photographed image acquisition means for acquiring a photographed image photographed by photographing means capable of photographing a target image including predetermined information; reference means for referring to storage means for storing the target image photographed in the past and the information extracted from the target image in the past, in association with each other; determination means for determining whether the target image photographed in the past has been captured in the photographed image; and processing execution means for executing, when the target image photographed in the past has been captured in the photographed image, predetermined processing based on the information associated with the target image.

According to one embodiment of the present invention, the information processing device further includes: requesting means for requesting, when a new target image that has not been photographed in the past has been captured in the photographed image, a server to extract the information based on the photographed image; and reception means for receiving the information extracted by the server, and the processing execution means is configured to execute, when the new target image has been captured in the photographed image, the predetermined processing based on the information received from the server.

According to one embodiment of the present invention, the storage means is configured to store the target image photographed in the past and the information extracted by the server in the past, in association with each other, and the information processing device further includes storing means for storing, when the new target image has been captured in the photographed image, the new target image and the information received from the server in the storage means in association with each other.

According to one embodiment of the present invention, the target image includes a predetermined pattern, the photographing means is configured to continuously photograph the target image, and the requesting means is configured to request, when the pattern is detected from the photographed image, the server to extract the information.

According to one embodiment of the present invention, the information processing device further includes editing means for editing, when the pattern is detected from the photographed image, the photographed image based on a detection result of the pattern, and the requesting means is configured to request the server to extract the information based on the edited photographed image.

According to one embodiment of the present invention, the target image has a format including a first format and a second format which is more complicated in extraction of the information than in the first format, the information processing device further includes: identification means for identifying the format of the target image captured in the photographed image; and extraction means for extracting, when the target image captured in the photographed image is in the first format, the information from the photographed image, and the requesting means is configured to request, when the target image captured in the photographed image is in the second format, the server to extract the information.

According to one embodiment of the present invention, the target image includes a predetermined pattern, the photographing means is configured to continuously photograph the target image, and the determination means is configured to determine, when the pattern is detected from the photographed image, whether the target image photographed in the past has been captured in the photographed image from which the pattern has been detected.

According to one embodiment of the present invention, the information processing device further includes editing means for editing, when the pattern is detected from the photographed image, the photographed image based on a detection result of the pattern, the storage means is configured to store the target image captured in the photographed image photographed and edited in the past and the information extracted from the target image in the past, in association with each other, and the determination means is configured to determine whether the target image captured in the photographed image photographed and edited in the past has been captured in the photographed image newly photographed and edited.

According to one embodiment of the present invention, the determination means is configured to use template matching or histogram distribution to determine whether the target image photographed in the past has been captured in the photographed image.

According to one embodiment of the present invention, the photographing means is capable of photographing a plurality of target images at a time, and the processing execution means is configured to execute, when the plurality of target images have been captured in the photographed image, the predetermined processing based on a plurality of pieces of information respectively corresponding to the plurality of target images.

According to one embodiment of the present invention, the information includes information relating to payment of a product or a service, the target image is photographed when the product is purchased or when the service is used, and the predetermined processing includes payment processing relating to the product or the service.

According to one embodiment of the present invention, the target image includes an image obtained by embedding the information in an image in which a subject has been captured.

Advantageous Effects of Invention

According to one embodiment of the present invention, it is possible to reduce the processing load.

BRIEF DESCRIPTION OF DRAWINGS

FIG. 5 is a table for showing a data storage example of extracted data.

DESCRIPTION OF EMBODIMENTS

1. Overall Configuration of Information Processing System

Figure 1:
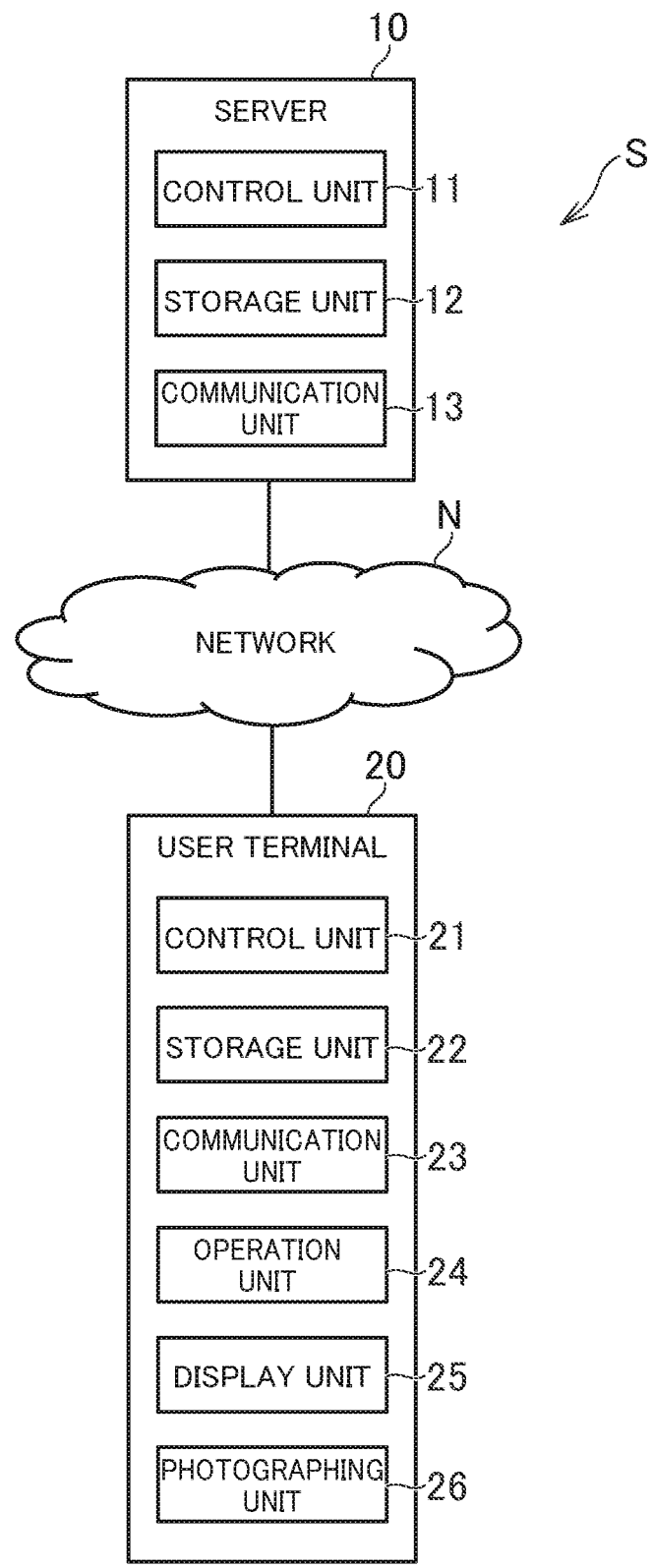
FIG. 1 is a diagram for illustrating an overall configuration of an information processing system according to one embodiment of the present invention.

There is now described an example of an information processing system according to one embodiment of the present invention. FIG. 1 is a diagram for illustrating an overall configuration of the information processing system of the embodiment. As illustrated in FIG. 1, an information processing system S includes a server 10 and a user terminal 20, each of which can be connected to a network N, for example, the Internet. In FIG. 1, there is illustrated one server 10 and one user terminal 20, but there may be a plurality of servers and user terminals.

The server 10 is a server computer. The server 10 includes a control unit 11, a storage unit 12, and a communication unit 13. The control unit 11 includes at least one processor. The control unit 11 executes processing in accordance with programs and data stored in the storage unit 12. The storage unit 12 includes a main memory unit and an auxiliary memory unit. For example, the main memory unit is a volatile memory, for example, a RAM, and the auxiliary memory unit is a non-volatile memory such as a ROM, an EEPROM, a flash memory, or a hard disk drive. The communication unit 13 is a communication interface for wired communication or wireless communication, and performs data communication via the network N.

The user terminal 20 is a computer to be operated by a user. The user terminal 20 is an example of an information processing device. Therefore, the user terminal 20 referred to in the description of this embodiment can be read as the information processing device. The information processing device is not limited to the user terminal 20, and may be any computer. For example, a computer that is not particularly operated by the user may correspond to the information processing device, or a server computer may correspond to the information processing device.

For example, the user terminal 20 is a cell phone (including smartphones), a portable information terminal (including tablet computers and wearable terminals), or a personal computer. In this embodiment, the user terminal 20 includes a control unit 21, a storage unit 22, a communication unit 23, an operation unit 24, a display unit 25, and a photographing unit 26. The physical configuration of each of the control unit 21, the storage unit 22, and the communication unit 23 may be the same as those of the control unit 11, the storage unit 12, and the communication unit 13, respectively.

The operation unit 24 is an input device, and is, for example, a pointing device such as a touch panel and a mouse, a keyboard, or a button. The operation unit 24 transmits details of operation to the control unit 21. The display unit 25 is, for example, a liquid crystal display unit or an organic EL display unit. The display unit 25 displays an image in accordance with an instruction of the control unit 21.

The photographing unit 26 includes at least one camera. For example, the photographing unit 26 includes an image pickup element such as a CCD image sensor or a CMOS image sensor, and records a photographed image picked up by the image pickup element as digital data. The photographed image may be a still image or a moving image picked up continuously at a predetermined frame rate.

Programs and data to be described as being stored into the storage units 12 and 22 may be supplied thereto via the network N. Further, the respective hardware configurations of the computers described above are not limited to the above-mentioned examples, and various types of hardware can be applied thereto. For example, the hardware configuration may include a reading unit (e.g., an optical disc drive or a memory card slot) configured to read a computer-readable information storage medium, or an input/output unit (e.g., a USB port) configured to input and output data to/from an external device. For example, the program and the data stored in the information storage medium may be supplied to each of the computers through intermediation of the reading unit or the input/output unit.

2. Outline of Information Processing System

In this embodiment, the user operates the user terminal 20 to cause the photographing unit 26 to photograph a target image including predetermined information. The predetermined information included in the target image is extracted by analyzing a portion of the photographed image generated by the photographing unit 26, in which the target image has been captured.

The predetermined information refers to information embedded in the target image. In other words, the predetermined information is information to be extracted. The description of this embodiment is directed to a case in which the predetermined information is embedded in the target image in a state of being unable to be visually recognized by the user, but the predetermined information may be embedded in the target image in a visually recognizable state. The predetermined information is hereinafter referred to as "embedded information". Therefore, the embedded information referred to in the description of this embodiment can be read as the predetermined information.

The target image refers to an image in which the embedded information is embedded. In other words, the target image is an image from which the embedded information is to be extracted. The description of this embodiment is directed to a case in which the target image is an image obtained by embedding the embedded information in an image (photograph) in which a subject has been captured, but the target image may be in another form. For example, the target image may be an image obtained by embedding the embedded information in CG in which an imaginary object (for example, character) is drawn instead of a real-world subject. In addition, for example, the target image may be an image in which the embedded information is represented by a design that is not particularly concrete or another such pattern.

The subject presented in the target image may be any object, and may be, for example, a person, an animal, food and drink, clothing, furniture, a home appliance, a vehicle, or a landscape. In the target image, a subject that matches a scene in which the target image is used may be presented, or a subject that is not particularly relevant to the scene in which the target image is used may be presented. In other words, in the target image, a subject relevant to the embedded information may be presented, or a subject that is not particularly relevant to the embedded information may be presented.

The description of this embodiment is directed to a case in which the target image is printed on paper, film, or another such medium, but the target image may be displayed on a screen of, for example, a smartphone, a tablet terminal, or a personal computer. The description of this embodiment is also directed to a case in which the target image is a square having a predetermined size, but any shape and any size can be used for the target image.

The photographed image refers to an image generated by the photographing unit 26. In other words, the photographed image is an image indicating a detection result obtained by optically detecting the subject present in a photographing range of the photographing unit 26. In this embodiment, the target image printed on, for example, paper is photographed, and hence the entirety or a part of the printed target image is captured in the entirety or apart of the photographed image. The description of this embodiment is directed to a case in which the photographing unit 26 continuously performs photographing based on a predetermined frame rate and each of individual images that form a moving image corresponds to the photographed image, but the photographed image may be a still image photographed each time the user performs a predetermined photographing operation.

In this embodiment, processing to be performed in the information processing system S is described by taking an exemplary case in which a target image is printed on a poster of a personal computer manufactured by a certain manufacturer with a URL to a website of the manufacturer being embedded in the target image as the embedded information. As described later in Modification Examples, the information processing system S may be applied to any scene, and may be applied to other scenes.

Figure 2:
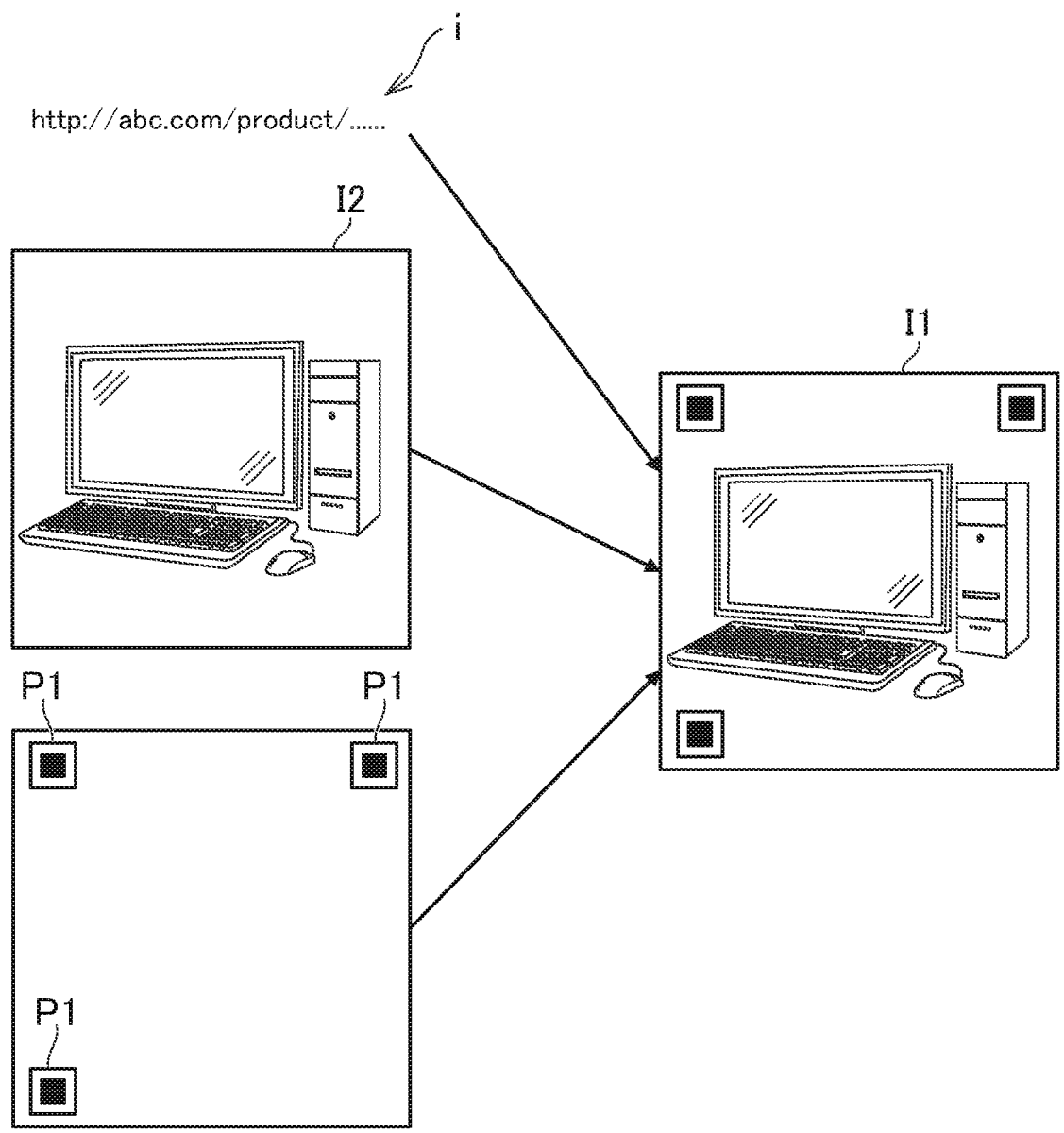
FIG. 2 is a diagram for illustrating an example of a target image.
Figure 3:
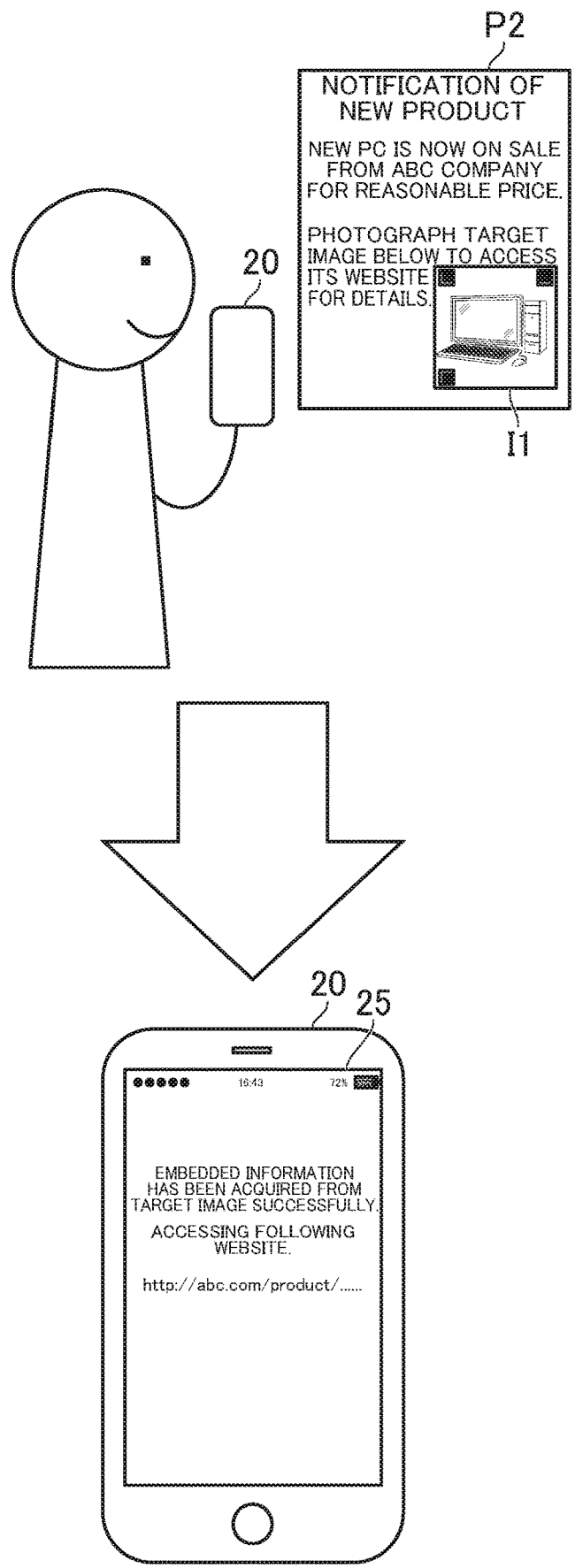
FIG. 3 is a diagram for illustrating how the target image is photographed.

FIG. 2 is a diagram for illustrating an example of the target image, and FIG. 3 is a diagram for illustrating how the target image is photographed. As illustrated in FIG. 2, in a target image I1, embedded information "i" is embedded in an original image I2. In addition, in this embodiment, a predetermined position detection pattern P1 is added to a predetermined position in the target image I1.

The original image I2 is an image generated by photographing a subject with a camera. In other words, the original image I2 is an image obtained before the embedded information "i" is embedded. For example, a person involved in the manufacturer photographs a personal computer manufactured by his/her own company with a camera, to thereby generate the original image 12.

For example, as the embedded information "i", a character string indicating the URL to the website of the manufacturer is converted into a design or another such image pattern to be embedded in a state of being unable to be visually discriminated. As a method of embedding the embedded information "i" itself, a known method can be used. For example, the method "Matthew Tancik, Ben Mildenhall, RenNg, StegaStamp: Invisible Hyperlinks in Physical Photographs, https://arxiv.org/abs/1904.05343" (hereinafter referred to as "StegaStamp method"), which is mentioned in the related art, may be used, or a perceptible or imperceptible method used for digital watermarking may be used.

The position detection pattern P1 is provided in order to detect the target image I1 from the photographed image. In this embodiment, a position detection pattern defined in a known two-dimensional code standard (for example, finder pattern in a QR code (trademark)) is described as the position detection pattern P1. However, it suffices that the position detection pattern P1 is a pattern defined in advance, and an original pattern defined by, for example, a manufacturer may be used.

As illustrated in FIG. 3, the target image I1 is printed on a poster P2 of a manufacturer. The user operates the user terminal 20 to photograph the target image I1 printed on the poster P2. For example, the user terminal 20 continuously performs photographing based on a predetermined frame rate, and determines whether or not the position detection pattern P1 has been detected from the photographed image of each individual frame. When the position detection pattern P1 has been detected from the photographed image, the photographed image has, for example, its size adjusted, and then the embedded information "i" is extracted therefrom.

In this respect, as described in the related art, processing for extracting the embedded information "i" often involves complicated image processing. Therefore, when an attempt is made to cause the user terminal 20 to analyze the photographed image and extract the embedded information "i", a processing load on the user terminal 20 may increase due to complicated processing. In view of this, the user terminal 20 transmits the target image I1 captured in the photographed image to the server 10, and requests the server 10 to extract the embedded information "i".

When receiving the photographed image from the user terminal 20, the server 10 uses a known method to extract the embedded information "i". The server 10 transmits the embedded information "i" that has been extracted to the user terminal 20. As illustrated in FIG. 3, when receiving the embedded information "i" from the server 10, the user terminal 20 causes the display unit 25 to display a URL indicated by the embedded information "i". After that, the user terminal 20 accesses the URL indicated by the embedded information "i", and the website of the manufacturer is displayed on the display unit 25.

As described above, the information processing system S is configured to execute complicated processing on the server 10 side, to thereby reduce the processing load on the user terminal 20. However, a large number of users use the information processing system S in actuality, and there are a large number of target images I. Therefore, when the server 10 receives analysis requests for the embedded information "i" from the respective users, a processing load on the server 10 may increase.

In view of this, the user terminal 20 stores the target image I1 photographed in the past and the embedded information "i" embedded in this target image I1 in the storage unit 22 in association with each other. The user terminal 20 is configured to read and use, when the target image I1 that has been photographed in the past is photographed, the embedded information "i" stored in the storage unit 22 without requesting the server 10 to perform the analysis, to thereby reduce the processing load on the server 10.

Meanwhile, the user terminal 20 is configured to request, when a new target image I1 that has not been photographed in the past is photographed, the server 10 to perform the analysis, to thereby cause complicated processing to be executed on the server 10 side and reduce the processing load on the user terminal 20. In addition, in this embodiment, the user terminal 20 is configured to extract, when a two-dimensional code from which the embedded information can be extracted by relatively simple processing is photographed, the embedded information by itself without requesting the server 10 to perform the analysis, to thereby reduce the processing load on the server 10.

Figure 6:
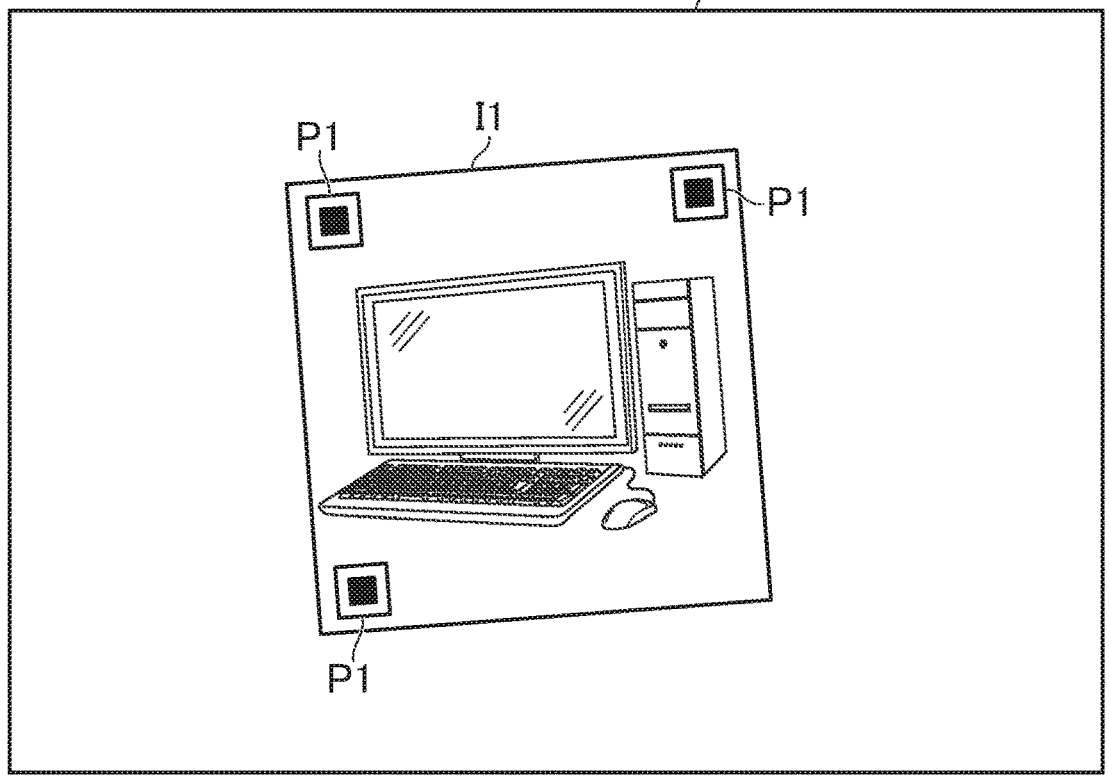
FIG. 6 is a diagram for illustrating how the photographed image is edited.
Figure 6:
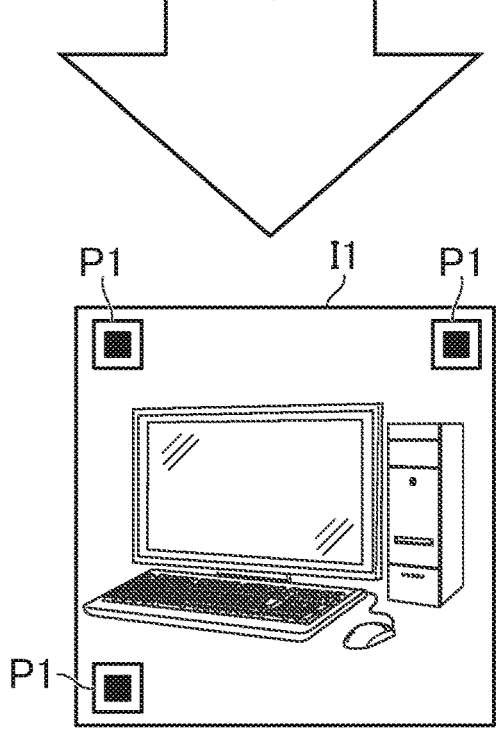

As described above, the information processing system S has a configuration that reduces the processing loads on both the server 10 and the user terminal 20. Now, detail of the above-mentioned configuration is described. In the following description, when it is not particularly required to refer to the accompanying drawings, the reference symbols of the target image I1, the original image I2, the embedded information "i", the position detection pattern P1, and the poster P2 are omitted. In the same manner, the reference symbol of a photographed image 13, which is described later with reference to FIG. 6, is omitted when it is not particularly required to refer to FIG. 6.

3. Functions Implemented in Information Processing System

Figure 4:
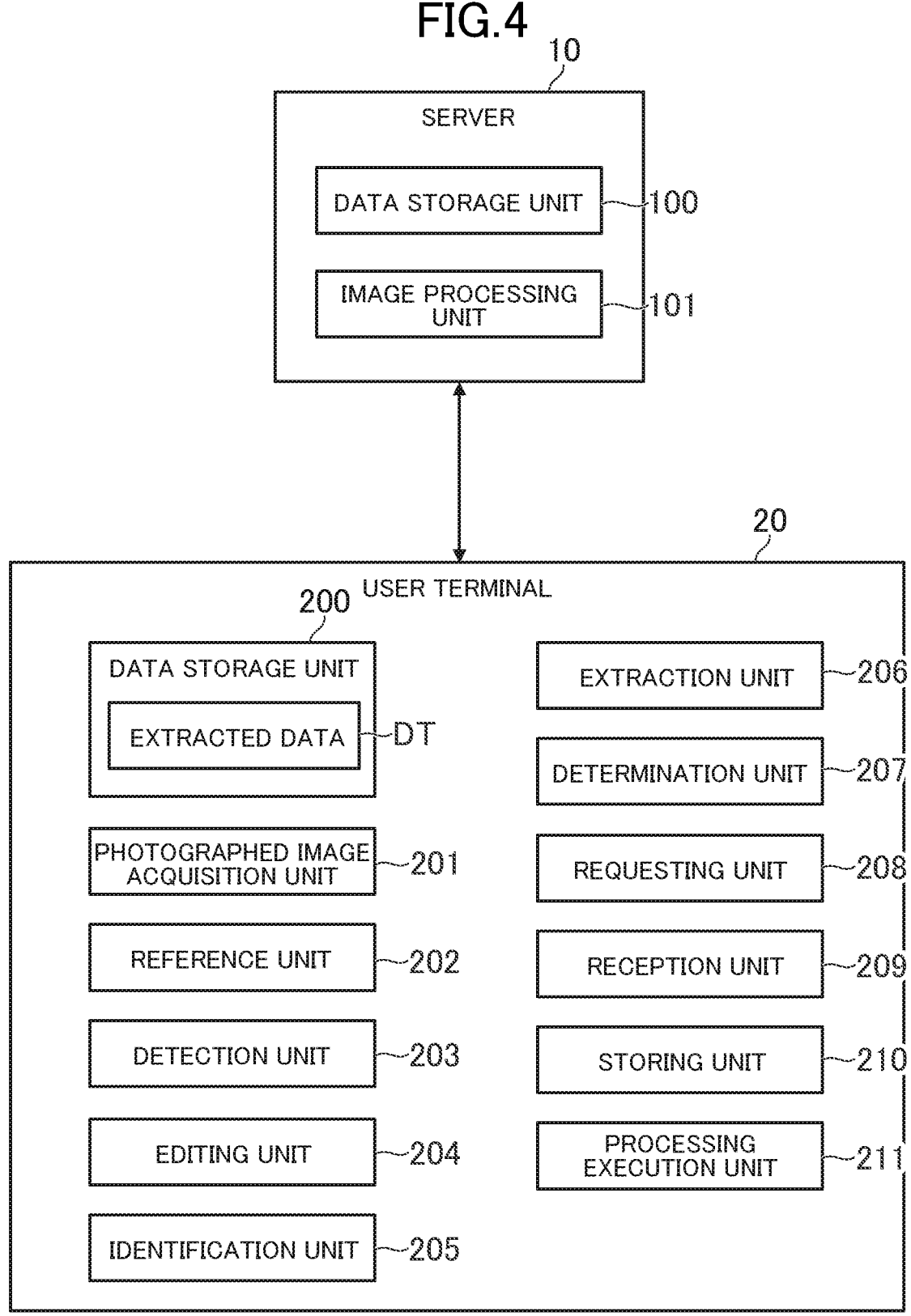
FIG. 4 is a functional block diagram for illustrating an example of functions implemented in the information processing system according to this embodiment.

FIG. 4 is a functional block diagram for illustrating an example of functions implemented in the information processing system S according to this embodiment. In this embodiment, the functions implemented on each of the server 10 and the user terminal 20 are described.

[3-1. Functions Implemented on Server]

As illustrated in FIG. 4, a data storage unit 100 and an image processing unit 101 are implemented on the server 10.

[Data Storage Unit]

The data storage unit 100 is implemented mainly by the storage unit 12. The data storage unit 100 is configured to store data required for executing processing described in this embodiment. As an example of data stored in the data storage unit 100, an encoder and a decoder are described below. When the target image is to be generated by a computer other than the server 10, the data storage unit 100 is not required to store the encoder. In this case, the encoder may be implemented by the computer other than the server 10.

The encoder is a program for embedding embedded information in an original image. When the original image and the embedded information are input to the encoder, a target image having the embedded information embedded in the original image is output. In this embodiment, the target image includes a position detection pattern, and hence the encoder adds the position detection pattern. The position detection pattern may be added by a program other than the encoder. As the encoder itself, a known program can be used, and hence details thereof are omitted. For example, the encoder may use a neural network or another such machine learning model as in the StegaStamp method, or may not particularly use the machine learning model.

When the machine learning model is not used, for example, the encoder generates the target image by combining the original image and the image indicating the embedded information. When the embedded information is to be embedded in an imperceptible state, the encoder changes the pixel value of a portion of the original image, in which the embedded information is presented, by a value of an imperceptible degree. When the embedded information is to be embedded in a perceptible state, the encoder changes the pixel value of the portion of the original image, in which the embedded information is presented, by a value equal to or larger than a fixed value. In addition, for example, the encoder may embed the embedded information through use of an embedding method corresponding to a method (for example, substitution method, frequency domain conversion method, diffusion method, statistical method, or vector quantization method) used for digital watermarking. In this embodiment, the term "embedding" has the same meaning as that of the term "encoding".

The decoder is a program for extracting the embedded information from the target image captured in the photographed image. The description of this embodiment is directed to a case in which a portion of the photographed image, in which the target image has been captured, is input to the decoder, but the entire photographed image may be input to the decoder. When the target image is input to the decoder, the embedded information embedded in the input target image is output. As the decoder itself, a known program can be used, and hence details thereof are omitted. For example, the decoder may use a neural network or another such machine learning model as in the StegaStamp method, or may not particularly use the machine learning model.

When the machine learning model is not used, for example, the decoder extracts the embedded information by obtaining a difference between the target image and the original image. In addition, for example, the decoder may extract the embedded information through use of an extraction method corresponding to a method (for example, substitution method, frequency domain conversion method, diffusion method, statistical method, or vector quantization method) used for digital watermarking. In this embodiment, the term "extraction" has the same meaning as that of the term "decoding".

[Image Processing Unit]

The image processing unit 101 is implemented mainly by the control unit 11. The image processing unit 101 is configured to extract the embedded information embedded in the target image based on the image received from the user terminal 20. The description of this embodiment is directed to a case in which the user terminal 20 transmits the portion of the photographed image, in which the target image has been captured, to the server 10. Therefore, the image processing unit 101 extracts the embedded information based on the above-mentioned portion received from the user terminal 20.

In this embodiment, the photographed image is edited by an editing unit 204 described later, and hence the image processing unit 101 extracts the embedded information based on the portion of the edited photographed image, in which the target image has been captured. For example, the image processing unit 101 inputs the above-mentioned portion to the decoder to acquire the embedded information output from the decoder. The image processing unit 101 transmits the embedded information output from the decoder to the user terminal 20. The method of extracting the embedded information by the decoder is as described above.

The user terminal 20 may transmit the entire photographed image to the server 10. In this case, the image processing unit 101 may extract the embedded information by cutting out a portion in which the target image has been captured from the entire photographed image received from the user terminal 20. The image processing unit 101 may also generate a target image based on the original image and the embedded information. In this case, the image processing unit 101 inputs the original image and the embedded information to the encoder to acquire the target image output from the encoder. For example, the image processing unit 101 transmits the target image output from the encoder to the server of the manufacturer, and the target image is printed on the poster by the manufacturer.

[3-2. Functions Implemented on User Terminal]

As illustrated in FIG. 4, a data storage unit 200, a photographed image acquisition unit 201, a reference unit 202, a detection unit 203, the editing unit 204, an identification unit 205, an extraction unit 206, a determination unit 207, a requesting unit 208, a reception unit 209, a storing unit 210, and a processing execution unit 211 are implemented on the user terminal 20.

[Data Storage Unit]

The data storage unit 200 is implemented mainly by the storage unit 22. The data storage unit 200 is configured to store data required for executing processing described in this embodiment. In this case, extracted data DT is described as an example of the data stored in the data storage unit 200.

FIG. 5 is a table for showing a data storage example of the extracted data DT. As shown in FIG. 5, in the extracted data DT, a target image photographed in the past and the embedded information extracted from the target image in the past are associated with each other. The description of this embodiment is directed to a case in which the portion of the photographed image, in which the target image has been captured, is cut out and stored in the extracted data DT, but the entire photographed image including the captured target image (that is, photographed image in which both the target image and the other portion have been captured) may be stored in the extracted data DT.

In addition, in this embodiment, the photographed image is edited by the editing unit 204 described later, and hence the target image captured in the photographed image photographed and edited in the past and the embedded information extracted from the target image in the past are associated with each other in the extracted data DT. That is, the target image that has been edited by the editing unit 204 is stored in the extracted data DT.

In addition, in this embodiment, the user terminal 20 requests the server 10 to extract the embedded information, and hence in the extracted data DT, the target image photographed in the past and the embedded information extracted by the server 10 in the past are associated with each other. That is, the embedded information received from the server 10 is stored in the extracted data DT.

In the extracted data DT, pairs of all the target images photographed by the user terminal 20 in the past and their corresponding pieces of embedded information may be stored, or pairs of some target images and their corresponding pieces of embedded information may be stored. For example, a pair of the target image and the embedded information that has not been used for a fixed period may be deleted from the extracted data DT.

In addition, the data stored in the data storage unit 200 is not limited to the above-mentioned example. For example, the data storage unit 200 may store a program for analyzing a two-dimensional code or a bar code, and may store a threshold value to be used for determination performed by the determination unit 207.

[Photographed Image Acquisition Unit]

The photographed image acquisition unit 201 is implemented mainly by the control unit 21. The photographed image acquisition unit 201 is configured to acquire the photographed image photographed by the photographing unit 26 capable of photographing the target image including the embedded information. In this embodiment, the photographing unit 26 performs photographing in real time, and hence the photographed image acquisition unit 201 repeatedly acquires a most recently photographed image from the photographing unit 26.

The photographed image may be in any data format, and may be in, for example, a JPEG, GIF, BMP, or PNG format. A size, a resolution, or other such information on the photographed image may also be freely set. The description of this embodiment is directed to a case in which the user terminal 20 includes the photographing unit 26, but the photographing unit 26 may be an external device for the user terminal 20. In this case, the photographed image acquisition unit 201 may acquire the photographed image from the photographing unit 26 through use of wired communication or wireless communication.

In addition, the photographed image acquisition unit 201 is not required to acquire the photographed image from the photographing unit 26 in real time, and may acquire the photographed image that was photographed in the past. For example, the photographed image acquisition unit 201 may acquire the photographed image attached to, for example, an electronic mail.

[Reference Unit]

The reference unit 202 is implemented mainly by the control unit 21. The reference unit 202 is configured to refer to storage means for storing a target image acquired in the past and information extracted from the target image in the past, in association with each other. In this embodiment, the association between those is indicated in association data, which is stored in the data storage unit 200, and hence the reference unit 202 refers to the association data stored in the data storage unit 200.

When the association data is stored in a computer other than the user terminal 20 (that is, when the storage means is implemented by another computer), the reference unit 202 transmits a reference request for the association data to the computer other than the user terminal 20. In addition, for example, when the association data is stored in an information storage medium externally connected to the user terminal 20 (that is, when the storage means is implemented by an external information storage medium), the reference unit 202 reads out the association data from the external information storage medium.

[Detection Unit]

The detection unit 203 is implemented mainly by the control unit 21. The detection unit 203 is configured to detect the position detection pattern from the photographed image. As described above, the description of this embodiment is directed to a case in which the position detection pattern in a known two-dimensional code is a predetermined pattern. Therefore, the position detection pattern referred to in the description of this embodiment can be read as a predetermined pattern.

The detection of the position detection pattern refers to determination of presence or absence of the position detection pattern. In other words, the detection of the position detection pattern refers to identification of the position, orientation, and size of the position detection pattern. For example, the detection unit 203 detects the position detection pattern from the photographed image based on a detection method defined by the two-dimensional code standard.

The shape and coloration of the position detection pattern are defined in advance, and hence the detection unit 203 detects the position detection pattern by determining whether or not the photographed image includes a portion having the shape and coloration defined in advance. For example, the detection unit 203 scans the photographed image in a plurality of directions to determine whether or not a portion exhibiting a predetermined ratio between white pixels and black pixels has been detected.

In the case of the position detection pattern illustrated in FIG. 2, the ratio between the white pixels and the black pixels is a predetermined ratio with the position detection pattern being located at any position or exhibiting any orientation, and a portion corresponding to the position detection pattern exhibits this ratio no matter which direction of the up-down direction, the left-right direction, and the oblique direction the photographed image is scanned in. Therefore, the detection unit 203 detects the portion exhibiting the above-mentioned ratio as the position detection pattern.

The detection method for the position detection pattern is not limited to the above-mentioned example, and any detection method can be used. For example, the detection unit 203 may use template matching to detect the position detection pattern, or may cause the machine learning model for use as an object detector to learn the position detection pattern in advance and input the photographed image to the machine learning model to detect the position detection pattern.

[Editing Unit]

The editing unit 204 is implemented mainly by the control unit 21. The editing unit 204 is configured to edit the photographed image based on a detection result of the position detection pattern when the position detection pattern is detected from the photographed image.

The detection result of the position detection pattern refers to a state in which the position detection pattern has been photographed in the photographed image. For example, the detection result of the position detection pattern corresponds to the position, size, and orientation of the position detection pattern. The editing of an image refers to subjecting the image to predetermined image processing. For example, the editing of an image corresponds to the shaping (changing) of the image, the changing of the size of the image, the rotating of the image, the cutting out of a part of the image, the changing of the color, or the changing of the brightness.

For example, the editing unit 204 edits the photographed image so that the position of the position detection pattern matches a predetermined position. In other words, the editing unit 204 edits the photographed image so that a positional relationship among a plurality of elements of the position detection pattern becomes a predetermined positional relationship. In addition, for example, the editing unit 204 edits the photographed image so that the size of the position detection pattern becomes a predetermined size. In addition, for example, the editing unit 204 edits the photographed image so that the orientation of the position detection pattern becomes a predetermined orientation.

FIG. 6 is a diagram for illustrating how the photographed image is edited. In the example of FIG. 6, a photographed image in which the position detection pattern P1 has been detected is denoted by a reference symbol 13. The editing unit 204 edits the photographed image I3 based on the detection result of the position detection pattern P1 captured in the photographed image 13, and cuts out, from the edited photographed image I3, a portion in which the target image I1 has been captured. For example, the editing unit 204 cuts out, from the edited photographed image 13, an area defined based on the position detection pattern P1 (for example, predetermined-size square area including the position detection pattern).

As illustrated in FIG. 6, even when the target image I1 captured in the photographed image I3 has a curve or distortion, the editing unit 204 performs the editing to eliminate the curve or distortion of the target image I1. In another case, the target image I1 captured in the photographed image I3 has been captured in a size larger or smaller than a normal size, the editing unit 204 performs the editing to adjust the target image I1 to a predetermined size. The edited target image I1 has the same shape and size as those of the target image photographed in the past, which is stored in the extracted data DT. This brings the target image I1 into a state that facilitates determination processing to be performed by the determination unit 207, which is described later.

[Identification Unit]

The identification unit 205 is implemented mainly by the control unit 21. In this embodiment, the target image has a format including a first format and a second format which is more complicated in the extraction of the embedded information than in the first format, and the identification unit 205 is configured to identify the format of the target image captured in the photographed image.

The first format is a format in which the embedded information is extracted relatively easily. For example, the first format is a code format defined by a known standard. The description of this embodiment is directed to a case in which the first format is a two-dimensional code format, for example, the QR code (trademark), but the first format may be another format, for example, the bar code format. For example, the two-dimensional code, in which the embedded information is expressed by a black-and-white pattern in an image, is an example of the format of the target image.

Meanwhile, the second format is a format in which a calculation amount for extracting the embedded information is larger than that in the first format. For example, the second format is a format that is not defined by a known standard. The description of this embodiment is directed to a case in which the second format indicates an image obtained by adding a position detection pattern to an image in which the embedded information has been embedded through use of the StegaStamp method, but the second format may be another format that does not particularly involve the addition of the position detection pattern. In addition, for example, the second format may indicate an image in which the embedded information has been embedded by the digital watermarking method, or may indicate an image obtained by adding the position detection pattern to the above-mentioned image.

The format of the target image may be identified by a method defined in advance. The distribution of pixel values of the entire image having the first format has a first feature, and the distribution of pixel values of the entire image having a second format has a second feature. Therefore, the identification unit 205 identifies the format of the photographed image by determining whether or not which of the first feature and the second feature the photographed image has.

In this embodiment, due to the first format being a two-dimensional code format and the second format being a format based on the StegaStamp method, the identification unit 205 counts the number of at least one of black pixels and white pixels of the photographed image. The identification unit 205 determines that the photographed image is in the first format when the counted number is equal to or larger than a threshold value, and determines that the photographed image is in the second format when the counted number is smaller than the threshold value. In other words, the identification unit 205 determines that the photographed image is in the first format when the photographed image includes a large number of black-and-white portions, and determines that the photographed image is in the second format when the photographed image includes a large number of color portions.

In addition, for example, the identification unit 205 may determine whether or not the photographed image includes a pattern other than the position detection pattern (for example, alignment pattern or timing pattern of the two-dimensional code). The identification unit 205 determines that the photographed image is in the first format when the pattern other than the position detection pattern has been detected, and determines that the photographed image is in the second format when the pattern other than the position detection pattern has not been detected. In addition, for example, the identification unit 205 may acquire a histogram of the photographed image to determine that the photographed image is in the first format when a certain specific pixel value has a high frequency and determine that the photographed image is in the second format when the frequencies of the pixel values are evenly distributed.

[Extraction Unit]

The extraction unit 206 is implemented mainly by the control unit 21. The extraction unit 206 is configured to extract the embedded information from the photographed image when the target image captured in the photographed image is in the first format. A program for extracting the embedded information from the target image in the first format is stored in the data storage unit 200 in advance, and the extraction unit 206 extracts the embedded information from the photographed image based on the stored program.

In this embodiment, the first format is a two-dimensional code format, and hence instructions to extract the embedded information by a procedure conforming to the two-dimensional code standard are described in the above-mentioned program. The extraction unit 206 extracts the embedded information based on an extraction procedure indicated by the program. That is, the extraction unit 206 extracts the embedded information from the photographed image so as to complete the processing on the user terminal 20 without requesting the server 10 to extract the embedded information.

[Determination Unit]

The determination unit 207 is implemented mainly by the control unit 21. The determination unit 207 is configured to determine whether or not the target image photographed in the past has been captured in the photographed image. In other words, the determination unit 207 determines whether or not the target image photographed in the past and the target image captured in the photographed image are the same. The fact that those images are the same corresponds to the fact that the target image photographed in the past has been captured in the photographed image.

The target image photographed in the past refers to the target image captured in the photographed image acquired in the past. In other words, the target image photographed in the past is the target image from which the embedded information has already been extracted. In this embodiment, the target image stored in the extracted data DT is the target image photographed in the past.

The determination unit 207 determines whether or not the target image photographed in the past has been captured in a newly-acquired photographed image. The newly-acquired photographed image refers to the photographed image acquired by the photographed image acquisition unit 201. The newly-acquired photographed image may mean the photographed image of the most recent frame, or may mean the photographed image acquired earlier by a certain number of frames. In other words, the newly-acquired photographed image may mean the photographed image that was photographed last, or may mean the photographed image that was photographed not last but within a fixed time period.

In this embodiment, the determination unit 207 uses template matching (pattern matching) or histogram distribution to determine whether or not the target image photographed in the past has been captured in the photographed image. In the template matching, the target image stored in the extracted data DT is to be compared to the photographed image. In the histogram distribution, a histogram of the target image stored in the extracted data DT is to be compared to the histogram of the photographed image.

For example, the determination unit 207 calculates a score utilizing the template matching based on the target image captured in the photographed image and the target image photographed in the past. This score is a matching degree in the template matching, and has a numerical value indicating a probability (likelihood) that objects presented in the images are the same. As a method of calculating the score, a known method can be employed as it is, and hence details thereof are omitted. For example, the score is calculated based on a difference between the pixel values of respective pixels of two images. As the total value of the difference between the pixel values becomes smaller, the score becomes higher. As the score becomes higher, the probability that objects presented in the two images are the same becomes higher. The determination unit 207 determines that the target image photographed in the past has been captured in the photographed image when the score utilizing the template matching is equal to or higher than a threshold value, and determines that the target image photographed in the past has not been captured in the photographed image when the score is lower than the threshold value. The threshold value to be used in the template matching may be a fixed value, or may be a variable value.

In addition, for example, the determination unit 207 calculates a score utilizing the histogram distribution based on the histogram of the photographed image and the histogram of the target image photographed in the past. This score is a difference in distribution indicated by the histograms, and means that the difference in distribution becomes smaller (degree of similarity in distribution becomes larger) as the score becomes higher. As a method of calculating the score, a known method can be employed as it is, and hence details thereof are omitted. For example, the score is calculated based on a difference in frequency of the respective pixel values indicated by the two histograms. As the total value of the difference in frequency becomes smaller, the score becomes higher. The determination unit 207 determines that the target image photographed in the past has been captured in the photographed image when the score utilizing the histogram distribution is equal to or higher than a threshold value, and determines that the target image photographed in the past has not been captured in the photographed image when the score is lower than the threshold value. The threshold value to be used in the histogram distribution may be a fixed value, or may be a variable value.

In this embodiment, the target image includes the position detection pattern, and the photographing unit 26 continuously photographs the target image. Therefore, when the position detection pattern is detected from a photographed image, the determination unit 207 determines whether or not the target image photographed in the past has been captured in the photographed image from which the position detection pattern has been detected. That is, of the photographed images continuously photographed by the photographing unit 26, the photographed image of a frame in which a predetermined pattern has been detected is used as a determination target of the determination unit 207.

In addition, in this embodiment, the photographed image is edited by the editing unit 204 described later, and hence the determination unit 207 determines whether or not the target image captured in the photographed image photographed and edited in the past has been captured in a photographed image newly photographed and edited. That is, the photographed image photographed by the photographing unit 26 is not directly used as the determination target of the determination unit 207, but the photographed image that has been edited by the editing unit 204 is used as the determination target of the determination unit 207.

[Requesting Unit]

The requesting unit 208 is implemented mainly by the control unit 21. The requesting unit 208 is configured to request the server 10 to extract the embedded information based on the photographed image when a new target image that has not been photographed in the past has been captured in the photographed image. That is, the requesting unit 208 requests the server 10 to extract the embedded information on condition that the new target image has been captured in the photographed image.

The new target image refers to a target image that has not been captured in the photographed image acquired in the past. In this embodiment, a target image not stored in the extracted data DT is the new target image. The fact that the determination unit 207 determines that the target image photographed in the past has not been captured in the photographed image corresponds to the fact that the new target image has been captured in the photographed image. For example, the fact that the position detection pattern has been detected from the photographed image but the target image photographed in the past has not been found in the photographed image corresponds to the fact that the new target image has been captured in the photographed image.

The request may be issued to the server 10 by transmitting data in a predetermined format. In this embodiment, a portion of the photographed image, in which the new target image has been captured, is cut out by the editing unit 204, and hence the requesting unit 208 transmits this cut-out portion to the server 10 to request the server 10 to extract the embedded information. The requesting unit 208 may transmit the entire photographed image to request the server 10 to extract the embedded information. In this case, the target image may be cut out on the server 10 to be transmitted to the user terminal 20.

In this embodiment, the target image includes a predetermined position detection pattern, and the photographing unit 26 continuously photographs the target image. When the position detection pattern is detected from a newly-acquired photographed image, the requesting unit 208 requests the server 10 to extract the embedded information. That is, the request is transmitted based on the photographed image of a frame in which the position detection pattern has been detected among the photographed images continuously photographed by the photographing unit 26.

In addition, in this embodiment, the photographed image is edited by the editing unit 204, and hence the requesting unit 208 requests the server 10 to extract the embedded information based on the edited photographed image. That is, the entire photographed image photographed by the photographing unit 26 is not directly used as the determination target of the determination unit 207, but the request is transmitted based on the photographed image that has been edited by the editing unit 204.

In addition, in this embodiment, the requesting unit 208 requests the server 10 to extract the embedded information when the target image captured in the photographed image is in the second format. That is, the requesting unit 208 requests the server 10 to extract the embedded information on condition that the target image captured in the photographed image is in the second format. When the target image captured in the photographed image is in the first format, the requesting unit 208 avoids requesting the server 10 to extract the embedded information.

[Reception Unit]

The reception unit 209 is implemented mainly by the control unit 21. The reception unit 209 is configured to receive the embedded information extracted by the server 10. In this embodiment, when receiving the request to extract the embedded information, the server 10 causes the image processing unit 101 to extract the embedded information, and transmits the embedded information to the user terminal 20. The reception unit 209 receives the embedded information extracted by the image processing unit 101. That is, the reception unit 209 receives, from the server 10, the embedded information extracted in response to the request issued by the requesting unit 208.

[Storing Unit]

The storing unit 210 is implemented mainly by the control unit 21. The storing unit 210 is configured to store, when the new target image has been captured in the photographed image, the new target image and the embedded information received from the server 10 in the storage means in association with each other. In this embodiment, the association between those is indicated in the association data, which is stored in the data storage unit 200, and hence the storing unit 210 stores the new target image and the embedded information received from the server 10 in the association data stored in the data storage unit 200 in association with each other.

When the association data is stored in a computer other than the user terminal 20 (that is, when the storage means is implemented by another computer), the storing unit 210 transmits the new target image and the embedded information received from the server 10 to the computer other than the user terminal 20 to cause the computer to store, in the association data, the new target image and the embedded information. In addition, for example, when the association data is stored in an information storage medium externally connected to the user terminal 20 (that is, when the storage means is implemented by an external information storage medium), the storing unit 210 stores the new target image and the embedded information received from the server 10 in the association data stored in the external information storage medium in association with each other.

[Processing Execution Unit]

The processing execution unit 211 is implemented mainly by the control unit 21. The processing execution unit 211 is configured to execute, when the target image photographed in the past has been captured in the photographed image, predetermined processing based on the embedded information associated with this target image. That is, on condition that the target image photographed in the past has been captured in the photographed image, the processing execution unit 211 executes the predetermined processing based on the embedded information associated with this target image.

The predetermined processing may be processing to be executed based on the embedded information, and any processing may be employed. The description of this embodiment is directed to a case in which the accessing of a URL indicated by the embedded information corresponds to the predetermined processing. For example, the predetermined processing may mean the outputting of the embedded information. The outputting referred to here means the displaying of the embedded information on the display unit 25 as an image, the outputting of the embedded information from, for example, a speaker as a sound, or the outputting of the embedded information as a vibration through use of a vibrator. That is, it suffices that the outputting is performed in visual, audible, or tactile manner. In addition, for example, the transmitting of the embedded information to another computer may correspond to the outputting of the embedded information.

In this embodiment, when the target image photographed in the past has been captured in the photographed image, the server 10 is not requested to extract the embedded information, and the embedded information stored in the extracted data DT is used instead. In this case, the processing execution unit 211 executes the predetermined processing based on the embedded information extracted by the server 10 and stored in the extracted data DT in the past.

Meanwhile, when the new target image has been captured in the photographed image, the server 10 is requested to extract the embedded information. Therefore, when the new target image has been captured in the photographed image, the processing execution unit 211 executes the predetermined processing based on the embedded information received from the server 10.

4. Processing to be Executed in this Embodiment

Figure 7:
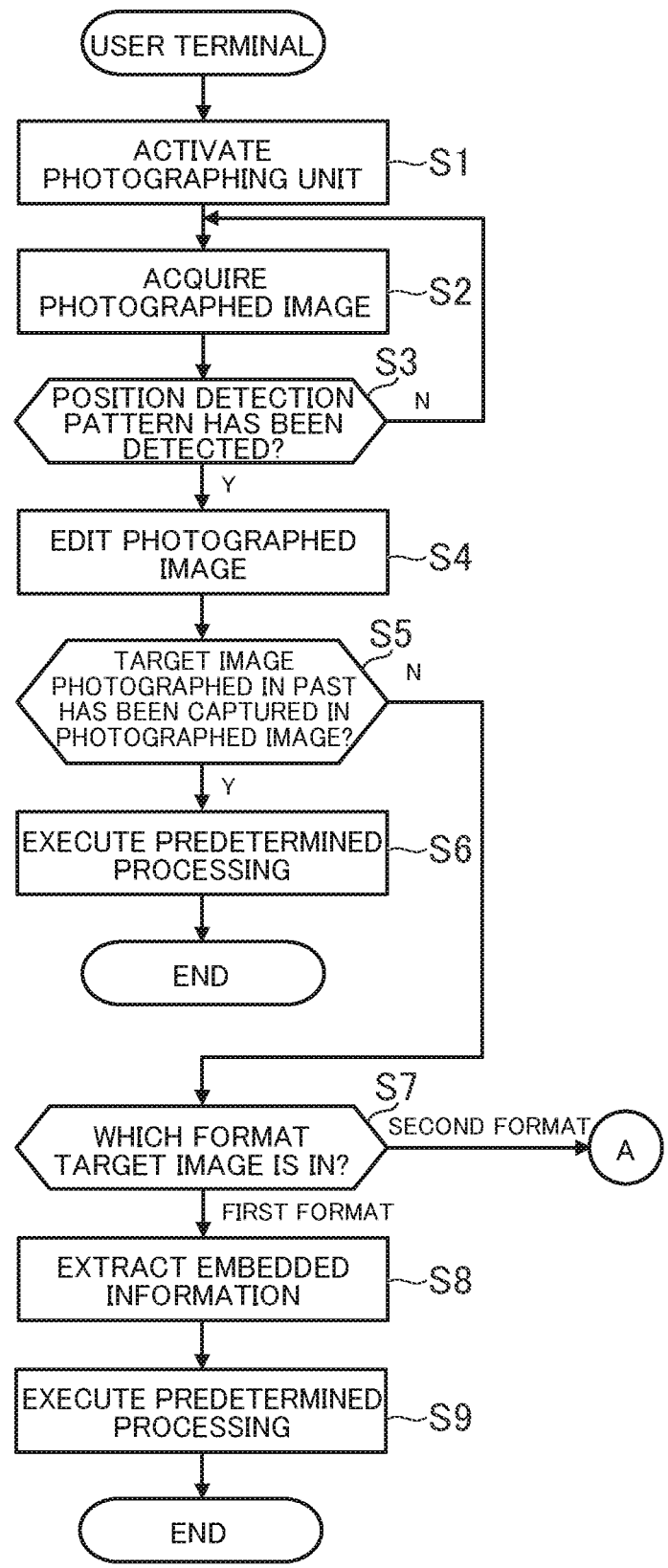
FIG. 7 is a flow chart for illustrating an example of processing to be executed in the information processing system.
Figure 8:
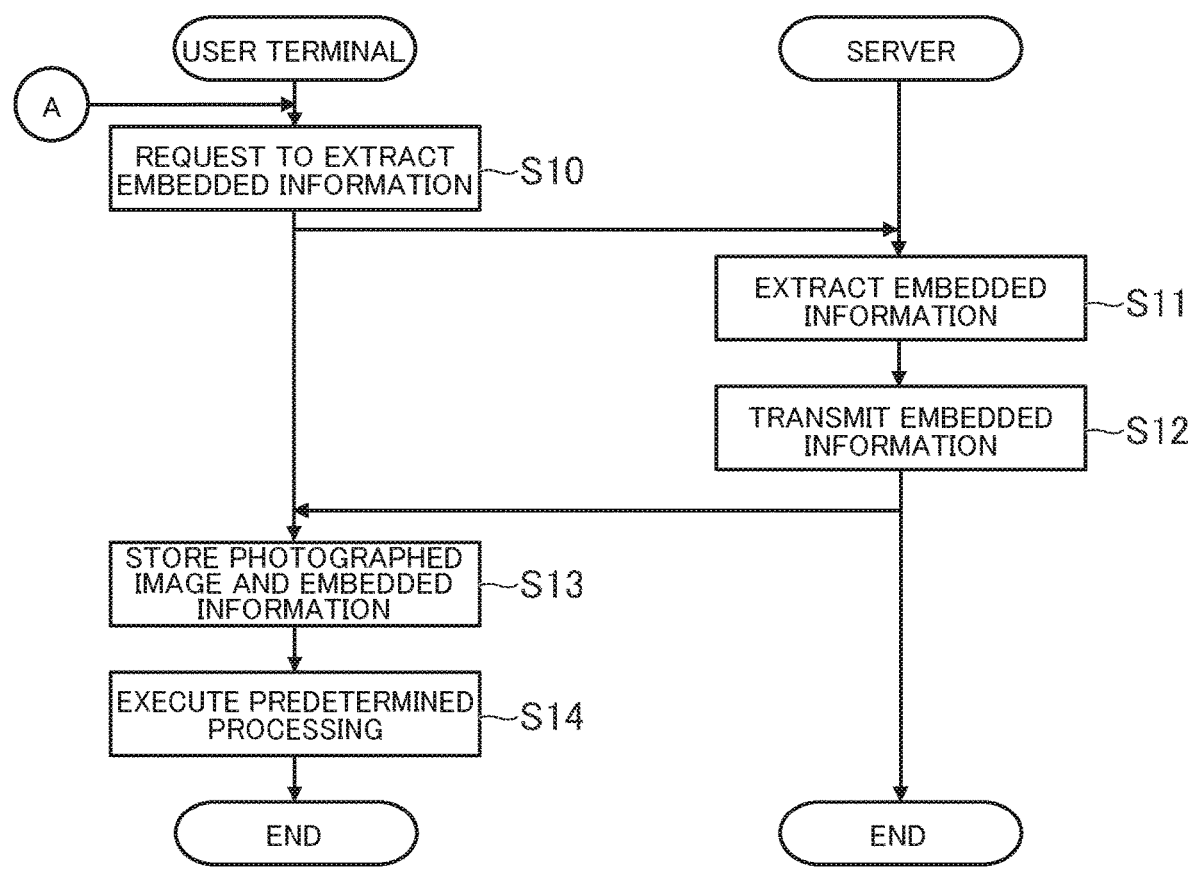
FIG. 8 is a flow chart for illustrating the example of the processing to be executed in the information processing system.

FIG. 7 and FIG. 8 are flowcharts for illustrating an example of processing to be executed in the information processing system S. The processing illustrated in FIG. 7 and FIG. 8 is executed by the control units 11 and 21 operating in accordance with programs stored in the storage units 12 and 22, respectively. The processing described below is an example of processing to be executed by the functional blocks illustrated in FIG. 4.

As illustrated in FIG. 7, first, on the user terminal 20, the control unit 21 activates the photographing unit 26 based on an operation of the operation unit 24 (Step S1). When the user performs a predetermined operation through the operation unit 24, the photographing unit 26 is activated to continuously perform photographing based on a predetermined frame rate. The photographing unit 26 photographs an image at a regular time interval to repeatedly generate a photographed image.

The control unit 21 acquires the photographed image generated by the photographing unit 26 (Step S2). In Step S2, the control unit 21 acquires the photographed image generated by the photographing unit 26, and causes the display unit 25 to display the photographed image. The photographed image may not be displayed on the display unit 25.

The control unit 21 determines whether or not the position detection pattern has been detected based on the photographed image (Step S3). In Step S3, the control unit 21 scans the photographed image in a predetermined direction to determine whether or not a portion exhibiting a predetermined ratio between white cells and black cells has been detected.

When it is determined that the position detection pattern has not been detected (N in Step S3), the procedure returns to the processing of Step S2. In this case, a photographed image is newly acquired, and the determination of Step S3 is again performed. After that, the processing of Step S2 and the processing of Step S3 are repeatedly performed until the position detection pattern is detected from the photographed image.

When it is determined that the position detection pattern has been detected (Y in Step S3), the control unit 21 edits the photographed image based on the position detection pattern (Step S4). In Step S4, the control unit 21 edits the photographed image so that the positional relationship among the elements of the position detection pattern in the photographed image becomes a predetermined positional relationship and that the size of the position detection pattern becomes the predetermined size, and cuts out the portion in which the target image has been captured. Through the processing of Step S4, the size of the target image cut out from the photographed image becomes the predetermined size, and the distortion and tilt of the target image are eliminated, to thereby bring the photographed image into a state suitable for the following determination of Step S5.

The control unit 21 determines whether or not the target image photographed in the past has been captured in the photographed image based on the extracted data DT and the photographed image edited in Step S4 (Step S5). In Step S5, the control unit 21 acquires a plurality of target images stored in the extracted data DT. For each of the acquired target images, the control unit 21 uses the template matching or the histogram distribution to calculate the score between the target image and the photographed image. When there is a target image exhibiting a score equal to or higher than the threshold value, the determination of Step S5 results in positive, and when there is no target image exhibiting a score equal to or higher than the threshold value, the determination of Step S5 results in negative.

When it is determined that the target image photographed in the past has been captured in the photographed image (Y in Step S5), the control unit 21 executes the predetermined processing based on embedded information stored in the extracted data DT (Step S6), and brings this processing to an end. In Step S6, the control unit 21 acquires the embedded information associated with the target image (target image exhibiting a score equal to or higher than the threshold value) determined to have been captured in the photographed image, and executes the predetermined processing based on the acquired embedded information.

Meanwhile, when it is not determined that the target image photographed in the past has been captured in the photographed image (N in Step S5), the control unit 21 identifies the format of the target image presented in the photographed image (Step S7). In Step S7, the control unit 21 calculates the ratio between the white pixels and the black pixels of the photographed image to determine that the format is the first format when the calculated ratio is equal to or larger than a threshold value and determine that the format is the second format when the calculated ratio is smaller than the threshold value.

When the target image is in the first format (first format in Step S7), the control unit 21 extracts the embedded information based on a procedure defined by a two-dimensional code standard (Step S8). In this case, the target image is a two-dimensional code, and hence the control unit 21 acquires a URL indicated by the two-dimensional code.

The control unit 21 executes the predetermined processing based on the embedded information extracted in Step S8 (Step S9), and brings this processing to an end. In Step S9, the control unit 21 causes the display unit 25 to display the URL indicated by the target image being the two-dimensional code, or accesses the URL to cause the display unit 25 to display the website.

Meanwhile, when the target image is in the second format (second format in Step S7), the procedure advances to FIG. 8, and the control unit 21 requests the server 10 to extract the embedded information (Step S10). It is assumed that the request transmitted in Step S10 includes a portion in which the target image edited and cut out from the photographed image in Step S4 has been captured.

On the server 10, when receiving the request, the control unit 11 extracts the embedded information based on the received image (Step S11). In Step S11, the control unit 11 inputs the image to the decoder to acquire the embedded information output from the decoder. The control unit 11 transmits the embedded information extracted in Step S11 to the user terminal 20 (Step S12).

On the user terminal 20, when receiving the embedded information, the control unit 21 stores the photographed image edited in Step S4 and the embedded information received from the server 10 in the extracted data DT in association with each other (Step S13).

The control unit 21 executes the predetermined processing based on the embedded information received from the server 10 (Step S14), and brings this processing to an end. In Step S14, the control unit 21 causes the display unit 25 to display the URL received from the server 10, or accesses the URL to cause the display unit 25 to display the website.

With the user terminal 20 described above, when the target image photographed in the past has been captured in the photographed image, the predetermined processing is executed based on the embedded information associated with this target. In this manner, the processing for extracting the embedded information is omitted when the target image from which the embedded information has already been extracted in the past is photographed, and hence it is possible to reduce the processing load on the user terminal 20. For example, when the extracted data DT is not provided unlike in this embodiment, even when the target image from which the embedded information has already been extracted in the past is photographed, the user terminal 20 is required to execute complicated processing for extracting the embedded information every time the photographed image is acquired. However, the information processing system S can omit such complicated processing, and can reduce the processing load on the user terminal 20. In addition, the steps up to the execution of the predetermined processing are simplified, to thereby be able to complete the predetermined processing more quickly and also be able to speed up the processing of the user terminal 20.

Further, when the new target image that has not been photographed in the past has been captured in the photographed image, the user terminal 20 requests the server 10 to extract the embedded information, to thereby be able to cause the server 10 to execute the complicated processing for extracting the embedded information and reduce the processing load on the user terminal 20. In addition, when the target image photographed in the past has been captured in the photographed image, the embedded information already extracted and stored in the user terminal 20 is used without requesting the server 10 to extract the embedded information, and hence the server 10 is no longer caused to execute undesired processing, to thereby be able to reduce the processing load on the server 10 as well. In this case, undesired photographed images and undesired embedded information are not transmitted onto the network N, and hence it is also possible to reduce a communication load on the network N.

Further, the user terminal 20 stores the new target image that has not been photographed in the past and the embedded information received from the server 10 in the extracted data DT in association with each other, to thereby be able to utilize the embedded information received from the server 10 for the next processing. In this manner, the embedded information extracted by the server 10 is accumulated on the user terminal 20, to thereby be able to effectively reduce the processing load on each of the server 10 and the user terminal 20. It is also possible to prevent an increase in memory consumption amount of the server 10 by storing the extracted data DT on the user terminal 20 side.

Further, when the position detection pattern is detected from the photographed image, the user terminal 20 requests the server 10 to extract the embedded information, to thereby be able to issue the request with the photographed image from which the embedded information is to be easily extracted. Therefore, it is possible to enhance the extraction accuracy of the embedded information. Meanwhile, when an unclear photographed image from which the embedded information is hard to be extracted is transmitted to the server 10, the server 10 cannot extract the embedded information, and is required to request the user terminal to again transmit another photographed image. This may increase the processing load on each of the server 10 and the user terminal 20, but it is possible to prevent an occurrence of such a situation.

Further, when the position detection pattern is detected from the photographed image, the user terminal 20 edits the photographed image based on the detection result of the position detection pattern, and requests the server 10 to extract the embedded information, to thereby be able to issue the request with the photographed image from which the embedded information is to be more easily extracted. Therefore, it is possible to effectively enhance the extraction accuracy of the embedded information, and it is also possible to effectively reduce the processing load on the server 10 and the user terminal 20.

Further, the user terminal 20 extracts the embedded information based on the photographed image when the target image captured in the photographed image is in the first format, and requests the server 10 to extract the embedded information when the target image captured in the photographed image is in the second format. Thus, the user terminal 20 extracts the embedded information by itself when only simple processing is required, and requests the server 10 to extract the embedded information when complicated processing occurs. In this manner, it is possible to reduce the processing load on each of the server 10 and the user terminal 20 in a well-balanced manner.

Further, when the position detection pattern is detected from the photographed image, the user terminal 20 determines whether or not the target image photographed in the past has been captured in the photographed image from which the position detection pattern has been detected, to thereby be able to execute the determination processing with the photographed image to be easily subjected to comparison. Therefore, it is possible to enhance the extraction accuracy of the embedded information. Meanwhile, when the determination processing is executed with the photographed image that is hard to be subjected to comparison, undesired determination processing is executed. This may increase the processing load on the user terminal 20, but it is possible to prevent an occurrence of such a situation.

Further, when the position detection pattern is detected from the photographed image, the user terminal 20 edits the photographed image based on the detection result of the position detection pattern, and determines whether or not the target image stored in the extracted data DT has been captured, to thereby be able to execute the determination processing with the photographed image to be more easily subjected to comparison. Therefore, it is possible to effectively enhance the extraction accuracy of the embedded information. It is also possible to effectively prevent the determination processing from being executed based on the photographed image that is hard to be subjected to comparison.

Further, the user terminal 20 uses the template matching or the histogram distribution to determine whether or not the target image photographed in the past has been captured in the photographed image, to thereby be able to execute the determination processing by simpler processing. Therefore, it is possible to effectively reduce the processing load on the user terminal 20.

Further, the target image is the image obtained by embedding the embedded information in the image in which the subject has been photographed, and hence it is possible to employ a more natural target image than the two-dimensional code or another such inorganic target image.

5. Modification Examples

One embodiment of the present invention is not limited to the embodiment described above, and can be modified suitably without departing from the spirit of the one embodiment of the present invention.

(1) For example, in the embodiment, the case in which one photographed image includes one target image has been described, but when a plurality of target images are densely arranged, one photographed image may include a plurality of target images. That is, the photographing unit 26 may be capable of photographing a plurality of target images at a time. The number of target images included in the photographed image may be any number as long as the target images fall within the photographing range of the photographing unit 26. For example, the photographing unit 26 may photograph about two to four target images at a time, or may photograph five or more target images at a time.

In this Modification Example, when a newly-acquired photographed image includes a plurality of target images, the determination unit 207 determines whether or not each of the plurality of target images is the same as the photographed image acquired in the past. That is, the determination unit 207 determines for each of the target images presented in the photographed image whether or not the each of the target images is the same as the photographed image acquired in the past. Each individual determination processing procedure is as described in the embodiment.

When the plurality of target images has been captured in the photographed image, the processing execution unit 211 executes the predetermined processing based on a plurality of pieces of embedded information respectively corresponding to the plurality of target images. That is, the processing execution unit 211 executes the predetermined processing for each of the target images presented in the photographed image based on the embedded information corresponding to the each of the target images.

For example, when all the plurality of target images captured in the photographed image are stored in the extracted data DT, the processing execution unit 211 refers to the extracted data DT to acquire the plurality of pieces of embedded information respectively corresponding to the plurality of target images. In another case, for example, when only some of the plurality of target images captured in the photographed image are stored in the extracted data DT, the processing execution unit 211 refers to the extracted data DT to acquire pieces of embedded information for the some target images, and receives pieces of embedded information for the other target images from the server 10. In still another case, for example, when none of the plurality of target images captured in the photographed image is stored in the extracted data DT, the processing execution unit 211 receives the plurality of pieces of embedded information respectively corresponding to the plurality of target images from the server 10.

This Modification Example is different from the embodiment in which the predetermined processing is executed based on one piece of embedded information, in that the processing execution unit 211 executes the predetermined processing based on each of a plurality of pieces of embedded information. The details of each individual predetermined processing procedure are as described in the embodiment.

According to Modification Example (1), when a plurality of target images have been captured in the photographed image, the predetermined processing is executed based on the plurality of pieces of embedded information respectively corresponding to the plurality of target images, and hence a plurality of predetermined processing procedures respectively corresponding to the plurality of pieces of embedded information are executed by one photographing operation, to thereby be able to enhance the convenience of the user. In addition, the plurality of predetermined processing procedures are executed by one photographing operation, and hence the photographing is not required to be executed a plurality of times, to thereby be able to reduce the processing load on the user terminal 20. The server 10 is also not required to analyze a plurality of photographed images, to thereby be able to reduce the processing load on the server 10.

(2) Further, for example, the information processing system S can be used in any scene, and may be used for electronic payment. In this case, the embedded information is information relating to payment of a product or a service. The product may be any product, for example, food and drink, clothing, sundry goods, furniture, or daily necessities. The service may be any service, for example, a food and drink providing service, a financial service, an insurance service, or a communication service. The electronic payment is also an example of the service.

It suffices that the information relating to the payment is information required for payment, for example, an ID for identifying a product or a service, an ID for identifying the provider of the product or the service, information indicating the price of the product or the service, or information indicating the quantity of products or services. In addition, for example, when payment is performed through electronic money transfer or bank transfer, information for identifying a transfer destination or the bank account of the transfer destination may correspond to the information relating to the payment.

In this Modification Example, the target image is photographed when a product is purchased or when a service is used. For example, the target image is printed on the menu of the product, the surface of the product, the package of the product, the display location of the product, or the poster of the product, and its printed matter is placed in, for example, a shop. In another case, for example, the target image is printed on a restaurant menu or a service manual, and its printed matter is placed in a service providing place. As described in the embodiment, the target image may be displayed on a screen instead of being printed on, for example, paper.

The predetermined processing is payment processing relating to the product or the service. When the user operates the user terminal 20 to photograph the target information and the user terminal 20 acquires the embedded information, the payment processing is executed. The payment processing may be any processing, and may be, for example, payment using a credit card. For example, credit card information, electronic value (for example, electronic money or points) account information, virtual currency account information, bank account information, and debit card information are stored in the user terminal 20, and the embedded information and those pieces of information are used to execute the payment processing.

For example, the processing execution unit 211 may execute credit processing based on the credit card information, processing for decreasing the balance of electronic value, processing for decreasing the balance of virtual currency, processing for withdrawing or transferring money from the bank account, or processing for decreasing the balance of an account indicated by the debit card information. When the payment processing is executed, the fact is displayed on, for example, the display unit 25 of the user terminal 20, and the user receives the product or uses the service. For example, after confirming the completion of the payment processing on the user terminal 20, the staff of the shop hands over the product to the user, or provides the service. A message may be transferred to and displayed on another computer, for example, a terminal operated by the staff of the shop, instead of the user terminal 20.

According to Modification Example (2), it is possible to reduce the processing loads on the server 10 and the user terminal 20 when the payment for the product or the service is performed. In particular, when the user terminal 20 is used for the payment processing and authentication processing at the time of payment, it is required to prevent a failure of the payment processing and the authentication processing. However, it is possible to prevent the failure of the payment processing and the authentication processing by reducing the processing loads on the server 10 and the user terminal 20. It is also possible to speedup the payment processing and the authentication processing by reducing the processing loads on the server 10 and the user terminal 20.

(3) Further, for Example, Modification Examples Described Above May be Combined.

Further, for example, in the embodiment, the user terminal 20 may have the same function as the image processing unit 101. In this case, the image processing unit 101 of the user terminal 20 uses the decoder to extract the embedded information when the target image photographed in the past has not been captured in the photographed image, and refers to the extracted data DT to acquire the embedded information without use of the decoder when the target image photographed in the past has been captured in the photographed image. Even with this configuration, the decoding processing is not always executed every time, and hence it is possible to reduce the processing load on the user terminal 20. In this case, the storing unit 210 may store, in the extracted data DT, the embedded information extracted by the image processing unit 101 of the user terminal 20.

In addition, for example, the target image is not required to include the position detection pattern. In this case, without the editing of the photographed image, the determination unit 207 may use, for example, a feature amount of the entire photographed image to determine whether or not the target image photographed in the past has been captured in the photographed image. This determination may be executed through use of the template matching or the histogram distribution, or may be executed through use of a machine learning model in which target images photographed in the past have been learned. Further, in addition to the URL output described in the embodiment and the payment described in Modification Example (2), the information processing system S can be used in any scene, for example, route direction, education, entertainment, or augmented reality. The embedded information suitable for the scene in which the information processing system S is to be used may be embedded in the target image in advance.

For example, there has been described a case in which the main functions are implemented by the server 10, but each function may be shared by a plurality of computers. For example, functions may be shared among the server 10 and the user terminal 20. Further, for example, when the information processing system S includes a plurality of server computers, the functions may be shared by those plurality of server computers. In addition, for example, the data described as being stored in the data storage unit 100 may be stored by a computer other than the server 10.

The invention claimed is:

1. An information processing device, comprising at least one processor configured to:
   acquire a photographed image photographed by a camera of a target image photographed in the past and comprising predetermined information, the predetermined information being embedded in the target image;
   refer to a storage that stores the target image photographed in the past and the predetermined information extracted from the target image, in association with each other;
   determine that the target image photographed in the past has been captured in the photographed image; and
   execute, based on a determination that the target image photographed in the past has been captured in the photographed image, predetermined processing based on the predetermined information associated with the target image,
   wherein the at least one processor is further configured to:
   request, based on a new target image that has not been photographed in the past being captured in the photographed image, a server to extract the predetermined information based on the photographed image;
   receive the predetermined information extracted by the server; and
   execute, based on the new target image being captured in the photographed image, the predetermined processing based on the predetermined information received from the server,
   wherein the target image has a format comprising one of a first format and a second format which is more complicated in extraction of the predetermined information than in the first format, wherein the first format is a format defined by a known standard and the second format is a format in which a position detection pattern is added by using a neural network,
   wherein the at least one processor is further configured to:
   identify the format of the target image captured in the photographed image;
   extract, based on the target image captured in the photographed image being in the first format, the predetermined information from the photographed image; and
   request, based on the target image captured in the photographed image being in the second format, the server to extract the predetermined information, and
   wherein the first format is comprised of a two-dimensional code format and the second format is comprised of an image obtained by adding a position detection pattern to an image in which the embedded information has been embedded through use of a predetermined embedding method.

2. The information processing device according to claim 1,
   wherein the storage is configured to store the target image photographed in the past and the predetermined information extracted by the server in the past, in association with each other, and
   wherein the at least one processor is further configured to store, based on the new target image being captured in the photographed image, the new target image and the predetermined information received from the server in the storage in association with each other.

3. The information processing device according to claim 1,
   wherein the target image includes a predetermined pattern,
   wherein the at least one processor is further configured to:
   acquire a plurality of photographs obtained by continuously photographing the target image, the plurality of photographs comprising the photographed image; and
   request, based on the predetermined pattern being detected from the photographed image, the server to extract the predetermined information.

4. The information processing device according to claim 3, wherein the at least one processor is further configured to:
   edit, based on the predetermined pattern being detected from the photographed image, the photographed image based on a detection result of the predetermined pattern; and
   request the server to extract the predetermined information based on the edited photographed image.

5. The information processing device according to claim 1,
   wherein the target image includes a predetermined pattern,
   wherein the at least one processor is further configured to:
   acquire a plurality of photographs by continuously photographing the target image, the plurality of photographs comprising the photographed image; and
   determine, based on the predetermined pattern being detected from the photographed image, that the target image photographed in the past has been captured in the photographed image from which the predetermined pattern has been detected.

6. The information processing device according to claim 5, wherein the at least one processor is further configured to edit, based on the predetermined pattern being detected from the photographed image, the photographed image based on a detection result of the predetermined pattern, wherein the storage is configured to store the target image captured in the photographed image photographed and edited in the past and the predetermined information extracted from the target image in the past, in association with each other, and wherein the at least one processor is further configured to determine whether the target image captured in the photographed image photographed and edited in the past has been captured in the photographed image newly photographed and edited.

7. The information processing device according to claim 1, wherein the at least one processor is further configured to use template matching or histogram distribution to determine whether the target image photographed in the past has been captured in the photographed image.

8. The information processing device according to claim 1, wherein the at least one processor is further configured to:

acquire a photograph including a plurality of target images, and execute, based on the plurality of target images being captured in the photographed image, the predetermined processing based on a plurality of pieces of information respectively corresponding to the plurality of target images.

9. The information processing device according to claim 1, wherein the predetermined information associated with the target image comprises information relating to payment of a product or a service, wherein the target image is photographed when the product is being purchased or when the service is being used, and wherein the predetermined processing comprises payment processing relating to the product or the service.

10. The information processing device according to claim 1, wherein the target image comprises an image obtained by embedding the predetermined information in an image in which a subject has been captured.

11. An information processing system, comprising:

the information processing device of claim 1; and a server comprising:

at least one server processor configured to:

receive a request from the information processing device, wherein the request is based on a new target image that has not been photographed in the past being captured in the photographed image;

extract, in response to the request, the predetermined information based on the photographed image; and send the predetermined information to the information processing device.

12. An information processing method, comprising:

acquiring a photographed image photographed by a camera of a target image photographed in the past and comprising predetermined information, the predetermined information being embedded in the target image;

referring to a storage that stores the target image photographed in the past and the predetermined information extracted from the target image, in association with each other;

determining that the target image photographed in the past has been captured in the photographed image; and executing, based on determination that the target image photographed in the past has been captured in the photographed image, predetermined processing based on the predetermined information associated with the target image, wherein the method further comprises:

requesting, based on a new target image that has not been photographed in the past being captured in the photographed image, a server to extract the predetermined information based on the photographed image;

receiving the predetermined information extracted by the server; and executing, based on the new target image being captured in the photographed image, the predetermined processing based on the predetermined information received from the server, wherein the target image has a format comprising one of a first format and a second format which is more complicated in extraction of the predetermined information than in the first format, wherein the first format is a format defined by a known standard and the second format is a format in which a position detection pattern is added by using a neural network, wherein the method further comprises:

identifying the format of the target image captured in the photographed image;

extracting, based on the target image captured in the photographed image being in the first format, the predetermined information from the photographed image; and requesting, based on the target image captured in the photographed image being in the second format, the server to extract the predetermined information, and wherein the first format is comprised of a two-dimensional code format and the second format is comprised of an image obtained by adding a position detection pattern to an image in which the embedded information has been embedded through use of a predetermined embedding method.

13. A non-transitory computer-readable information storage medium for storing a program for causing a computer to:

acquire a photographed image photographed by a camera of a target image photographed in the past and comprising predetermined information, the predetermined information being embedded in the target image;

refer to a storage that stores the target image photographed in the past and the predetermined information extracted from the target image, in association with each other;

determine that the target image photographed in the past has been captured in the photographed image; and execute, based on determination that the target image photographed in the past has been captured in the photographed image, predetermined processing based on the predetermined information associated with the target image, wherein the program is further configured to cause the computer to:

request, based on a new target image that has not been photographed in the past being captured in the photographed image, a server to extract the predetermined information based on the photographed image;

receive the predetermined information extracted by the server; and execute, based on the new target image being captured in the photographed image, the predetermined processing based on the predetermined information received from the server, wherein the target image has a format comprising one of a first format and a second format which is more complicated in extraction of the predetermined information than in the first format, wherein the first format is a format defined by a known standard and the second format is a format in which a position detection pattern is added by using a neural network, wherein the program is further configured to cause the computer to:

identify the format of the target image captured in the photographed image;

extract, based on the target image captured in the photographed image being in the first format, the predetermined information from the photographed image; and request, based on the target image captured in the photographed image being in the second format, the server to extract the predetermined information, and wherein the first format is comprised of a two-dimensional code format and the second format is comprised of an image obtained by adding a position detection pattern to an image in which the embedded information has been embedded through use of a predetermined embedding method.

14. The information processing device of claim 1, wherein the at least one processor is further configured to identify the format of the target image by:

counting a first number pixels of at least one of black or white pixels in the photographed image;

determining that the target image is in the first format based on the first number being equal to or greater than a threshold number; and determining that the target image is in the second format based on the first number being less than the threshold number.

15. The information processing device of claim 1, wherein the at least one processor is further configured to identify the format of the target image by:

determining that the target image is in the first format based on a pattern other than the position detection pattern being included in the photographed image; and determining that the target image is in the second format based on the pattern other than the position detection pattern not being included in the photographed image.

16. The information processing device of claim 1, wherein the at least one processor is further configured to identify the format of the target image by:

acquiring a histogram of the photographed image; and determining that the photographed image is in the first format based on a certain specific pixel value having a high frequency; and determining that the photographed image is in the second format based on frequencies of pixel values being evenly distributed.

* * * * *